UNITED STATES PATENT OFFICE.

FREDERIC H. HALL, OF ZANESVILLE, OHIO.

IMPROVEMENT IN THE MANUFACTURE OF TILING.

Specification forming part of Letters Patent No. 164,553, dated June 15, 1875; application filed March 16, 1875.

*To all whom it may concern:*

Be it known that I, FREDERIC H. HALL, of Zanesville, in the State of Ohio, have invented an Improved Process and Composition for the Manufacture of Tiling, of which the following is a specification:

I take kaolin or clay, and reduce it to a thin paste of about the consistency of thick cream, and strain it through a very fine sieve or bolting-cloth, for the purpose of removing all foreign substances. I then add a flux made either of feldspar, silica, alumina, potash, petunse, or lead-glass, prepared in the same manner as the clay. This mixture may be made either before or after straining. The quantity added depends entirely on the clay and materials used, and can only be determined by experience, but usually varies from five to fifteen per cent. of the amount of clay. It is then boiled until the gases are expelled. It is then dried so that it may be ground to a fine powder. It is then moistened with water or steam sufficiently to enable it to be handled after pressing. It is then pressed into molds of any desired shape. After removing from the molds it is dried slowly, after which it is subjected to a very high degree of heat, for the purpose of vitrifying or fusing the different materials together.

Should I wish to color any block or form, I take any colors desired, and dissolve them in a solution of alcohol, ether, water, or any other substance or substances necessary to dissolve them. I then mix said color or colors with clay prepared and mixed as above named, and continue the process as above described.

For inlaid blocks, I prepare the colored clay, as above described, press each color of the design for any one block in separate molds, then unite the colors thus pressed, according to the design, in one mold, and subject them to heavy pressure, thus making them into one block, which becomes solid by baking. I also make the inlaid blocks by having the die of the press made with a raised surface, so that where other colors than that of the block itself are designed to be used, a depression will be left in the clay, which is then filled with the colors desired, and, after being again pressed, is baked as above.

For making enameled tiling, I press the clay, prepared and mixed as first described, with a die having a raised surface to correspond to the design. After baking, the enamel is put on according to the design, and it is then baked a second time to fuse the enamel.

I claim as my invention—

1. In a process for making tiling, preparing the clay by dissolving it to a consistency about equal to that of cream, then passing the same through a sieve, and then boiling the same until the gases are expelled, substantially as set forth.

2. A process for making a tiling, consisting of purifying the clay in the manner described, evaporating the same to dryness, then crushing and grinding the same to a fine powder, then dampening it, and then pressing the same into molds and burning it, either with or without a flux mixed therewith, substantially as set forth.

FREDERIC H. HALL.

Witnesses:
I. G. KIMBALL,
H. D. CAPEL, Jr.